United States Patent [19]
Atobe et al.

[11] Patent Number: 6,120,124
[45] Date of Patent: Sep. 19, 2000

[54] INK JET HEAD HAVING PLURAL ELECTRODES OPPOSING AN ELECTROSTATICALLY DEFORMABLE DIAPHRAGM

[75] Inventors: Mitsuro Atobe; Hiroshi Koeda; Shinichi Yotsuya, all of Suwa, Japan

[73] Assignee: Seiko Epson Corporation, Tokyo, Japan

[21] Appl. No.: 08/937,559

[22] Filed: Sep. 25, 1997

Related U.S. Application Data

[63] Continuation-in-part of application No. 07/757,691, Sep. 11, 1991, Pat. No. 5,534,900, and application No. 08/259,554, Jun. 14, 1994, Pat. No. 5,513,431, which is a continuation of application No. 08/025,850, Mar. 3, 1993, abandoned, which is a division of application No. 07/757,691, Sep. 11, 1991, Pat. No. 5,534,900, and a continuation-in-part of application No. 08/069,198, May 28, 1993, abandoned.

[30] Foreign Application Priority Data

| Sep. 21, 1990 | [JP] | Japan | 2-252252 |
| Nov. 14, 1990 | [JP] | Japan | 2-307855 |
| Nov. 15, 1990 | [JP] | Japan | 2-309335 |
| Jun. 12, 1991 | [JP] | Japan | 3-140009 |
| Sep. 13, 1991 | [JP] | Japan | 3-234537 |
| Jul. 4, 1994  | [JP] | Japan | 5-152330 |

[51] Int. Cl.$^7$ ........................................... B41J 2/01
[52] U.S. Cl. ...................................... 347/15; 347/54
[58] Field of Search .............................. 347/15, 54, 48, 347/68, 9, 11

[56] References Cited

U.S. PATENT DOCUMENTS

| 4,312,008 | 1/1982  | Taub et al. ........................ 347/71 |
| 4,380,018 | 4/1983  | Andoh et al. .................. 347/54 X |
| 4,480,259 | 10/1984 | Kruger et al. ................. 347/54 X |
| 4,490,728 | 12/1984 | Vaught et al. ..................... 346/1.1 |
| 4,596,994 | 6/1986  | Matsuda et al. ................ 346/140 R |
| 5,144,342 | 9/1992  | Kubota ............................... 347/70 |
| 5,163,177 | 11/1992 | Komura ........................ 29/890.1 X |
| 5,513,431 | 5/1996  | Ohno et al. ...................... 29/890.1 |
| 5,534,900 | 7/1996  | Ohno et al. ......................... 347/54 |
| 5,563,634 | 10/1996 | Fujii et al. ............................ 347/9 |
| 5,644,341 | 7/1997  | Fujii et al. ........................... 347/11 |
| 5,668,579 | 9/1997  | Fujii et al. ........................... 347/54 |
| 5,734,395 | 3/1998  | Atobe et al. ......................... 347/54 |
| 5,818,473 | 10/1998 | Fujii et al. . |
| 5,821,951 | 10/1998 | Fujii et al. . |
| 5,894,316 | 4/1999  | Sakai et al. ......................... 347/54 |
| 5,912,684 | 6/1999  | Fujii et al. ........................... 347/54 |
| 5,975,668 | 11/1999 | Fujii et al. . |

FOREIGN PATENT DOCUMENTS

| 2-150353 | 6/1990 | Japan ................................. 347/54 |
| 2-162049 | 6/1990 | Japan ................................. 347/54 |

*Primary Examiner*—John Barlow
*Assistant Examiner*—C. Dickens
*Attorney, Agent, or Firm*—Eric B. Janofsky

[57] ABSTRACT

An ink jet recording apparatus capable of ejecting ink droplets in which the volume is precisely and easily controlled. The gradient of the pixel to be printed, based on a digital gradient input signal, is provided for printing high resolution gradient images using a low drive voltage in this ink jet head. More specifically, the ink jet recording apparatus of the present invention will include a diaphragm formed at one part of a wall of each independent ejection chamber, with electrodes formed opposite each diaphragm and spaced therefrom at a predetermined gap distance. Ink droplets are selectively ejected from nozzle openings in the ejection chamber by applying a voltage to generate an electrostatic force which momentarily deforms the diaphragm. Moreover, plurality of independent electrodes oppose each diaphragm and a pulse voltage is applied to a predetermined number of electrodes according to a gradient signal to eject ink droplets of a volume determined by the gradient signal.

28 Claims, 8 Drawing Sheets

INK JET HEAD HAVING PLURAL ELECTRODES OPPOSING AN ELECTROSTATICALLY DEFORMABLE DIAPHRAGM

CROSS REFERENCE TO RELATED APPLICATION

This application is a continuation-in-part of U.S. patent application Ser. No. 07/757,691, filed on Sep. 11, 1991 now issued as U.S. Pat. No. 5,534,900 and a continuation-in-part of U.S. patent application Ser. No. 08/259,554, filed Jun. 14, 1994 now issued as U.S. Pat. No. 5,513,431, which is a continuation of U.S. patent application Ser. No. 08/025,850 filed Mar. 3, 1993, now abandoned, which is a divisional of U.S. patent application Ser. No. 07/757,691 filed Sep. 11, 1991, issued as U.S. Pat. No. 5,534,900, and a continuation-in-part of U.S. patent application Ser. No. 08/069,198, filed May 28, 1993, now abandoned.

BACKGROUND OF THE INVENTION

1. Field of the Invention

The present invention relates to an ink jet recording apparatus which ejects ink droplets towards to a recording medium in response to electric drive pulses.

2. Description of the Related Art

Ink jet recording apparatuses have become popular in recent years due to their numerous merits, including quiet operation while printing, the ability to print at high speed and the ability to use low-cost plain paper. The ink-on-demand type ink jet recording apparatus (in which ink is ejected only when printing is required) has become the most common type of ink jet printer because it is not necessary to retrieve ink not used for printing.

A conventional ink-on-demand ink jet recording apparatus is described in Japanese Laid-Open Application JP-A-79171/1980. This recording apparatus provides plural electrostrictive distortion bodies (piezoelectric devices), which are linked to each ejection chamber. When activated by digital electric pulse, the piezoelectric element mechanically distorts one or more walls of its respective ejection chamber, to momentarily increase pressure inside the ejection chamber and force expulsion of an ink drop. One can actually control the volume of ink drop emitted as well, by controlling the length or magnitude of the driving pulse. Thus, a good gradient image can be obtained using the above-described ink jet head by simple application of a requisite pulse information to the desired piezoelectric elements contained in the head, at least in theory.

With this type of conventional ink jet recording apparatus, however, it is extremely difficult and time-consuming to affix the piezoelectric device to the ejection chamber, thus making manufacturing difficult and prone to error. Plus, in practice, the thickness of conventionally manufactured piezoelectric devices tends to vary greatly, and the thickness of the adhesive applied to attach them to a chamber wall also fluctuates. Together, these factors produce undesirable scattering in ejection chamber responsiveness, which can degrade output and even shorten the life of the head. Thus, it is, in fact difficult to precisely control the size of the ink droplets according to the gradient signal.

In addition, the drive voltage required to obtain an enough deflection increases as the size of the piezoelectric device (especially unimorphic piezoelectric devices) decreases, and it is therefore difficult to form small electrostrictive bodies, mount them in a high density package, and drive the electrostrictive bodies with a relatively low drive voltage. Therefore, using piezoelectric device technology in high density, multiple nozzle ink jet head implementations suitable for high resolution gradient image printing without high drive voltages is exceedingly difficult.

It is, therefore an object of the present invention to provide an ink jet recording apparatus for printing high resolution gradient images using a low drive voltage by easily and precisely controlling the ink ejection volume according to a digital gradient signal describing the gradient of each pixel.

SUMMARY OF THE INVENTION

To achieve the above and related objects, an ink jet recording apparatus according to the present invention comprises an ink jet head and a drive means. This ink jet head includes a plurality of nozzles to emit ink droplet patterns; and a corresponding plurality of ejection chambers in communication with the respective nozzles and drawing ink from preferably a common ink cavity. Each ejection chamber will include an electrostatic actuator comprising a diaphragm provided in part of a wall member of the ejection chamber, and an electrode opposing said diaphragm with a predetermined gap there between. The drive means will selectively apply a pulse voltage to each actuator so that ink droplets are ejected from said nozzles by deforming the diaphragms by means of electrostatic force. This ink jet recording apparatus of the preferred and alternative embodiments is further characterized in that the electrostatic actuators will include multiple independent electrodes opposing a single diaphragm; and the drive means will apply a pulse voltage to a predetermined number of electrodes within a particular electrostatic actuator according to a gradient signal so that ink droplets of a desired volume are ejected relating to said gradient signal.

In addition the applicants have found, it difficult to set the deflection (ink ejection-volume) of the diaphragm when a voltage is applied to two electrodes of equal area to precisely twice the deflection when the voltage is applied to only one electrode. This is because the diaphragm tends to deflect in a somewhat irregular and nonlinear fashion in response to different numbers of electrodes being energized. As described in more detail in reference to the embodiments, the present invention circumvents this problem by disposing a support member supporting the diaphragm between adjacent electrodes. As a result, when a voltage is applied to only one of these electrodes, deformation of the diaphragm can be suppressed to the point where it will not deflect excessively. Furthermore, with the supporting member in place, deflection can be uniformly determined according to the known area of its associated electrodes, so that the ink ejection volume can be easily controlled.

The ink jet recording apparatus according to the present invention operates by applying a pulse voltage between a diaphragm and the opposing electrodes, thereby charging the electrostatic actuator consisting of the diaphragm and opposing electrodes. When charge builds to a sufficient degree, the diaphragm is deflected by the Coulomb's force acting between the diaphragm and electrode. Thereafter, when the charge stored by the electrostatic actuator is then rapidly discharged, the restoring force resulting from the elasticity of the diaphragm itself causes the pressure inside the ejection chamber to rise instantaneously, thereby ejecting an ink droplet from the nozzle.

By using an electrostatic actuator which includes multiple independent electrodes opposing the one diaphragm, and a drive means which tailors activation of a number of these electrodes based on a received gradient signal as described herein below, the ink ejection volume per nozzle (i.e., the size of the dot formed on the recording medium) varies according to the number of electrodes to which the pulse voltage is applied. As a result, it is possible to digitally control the ink jet volume and achieve a gradient image by selecting the electrodes to which the pulse voltage is applied.

It should also be noted that because the displacement area of the diaphragms can be freely adjusted by varying the area of the corresponding electrodes, the desired ink ejection volume can also be selected by varying the combination of electrodes to which the pulse voltage is applied.

BRIEF DESCRIPTION OF THE DRAWINGS

A better understanding of the invention may be had when the following description of the alternative embodiments is considered in conjunction with the following drawings, in which.

DESCRIPTION OF THE PREFERRED EMBODIMENTS

Figure 1:
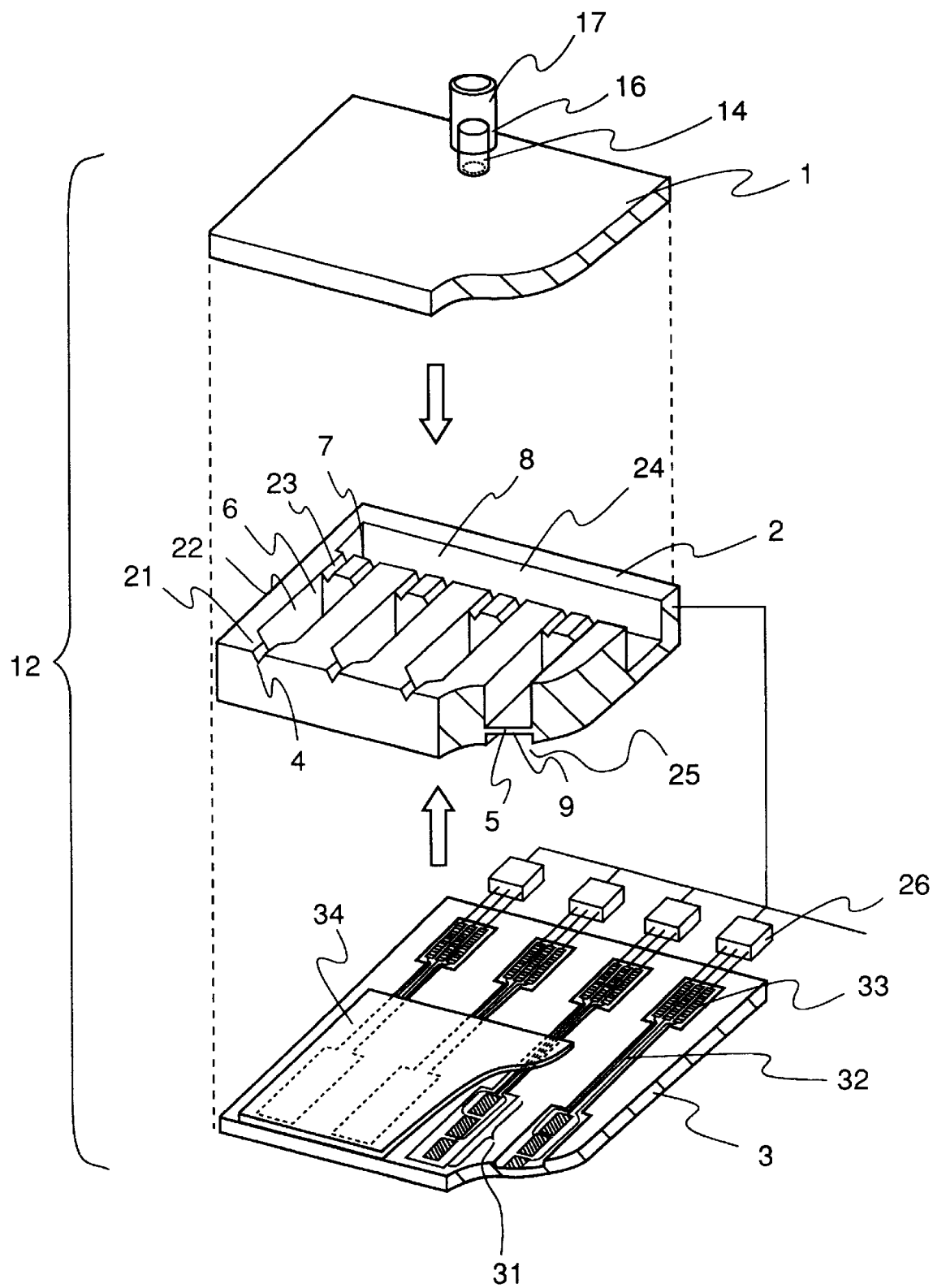
FIG. 1 is a partially exploded view and cross section of an ink jet recording apparatus according to the first embodiment of the present invention.

The presently preferred embodiments of the present invention are described hereinbelow with reference to the accompanying figures, of which FIG. 1 is a partially exploded view and cross section of the major components of an ink jet recording apparatus according to the first embodiment of the present invention.

Figure 2:
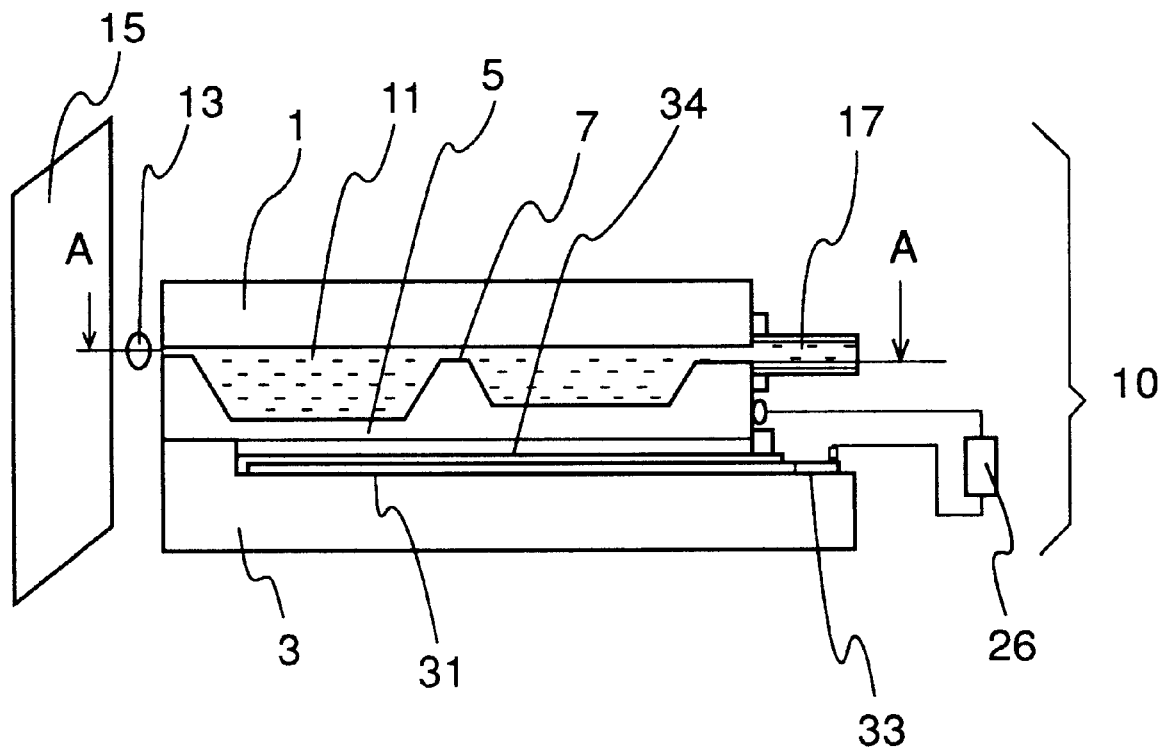
FIG. 2 is a side cross section of the ink jet recording apparatus according to the first embodiment of the present invention after assembly.
Figure 3:
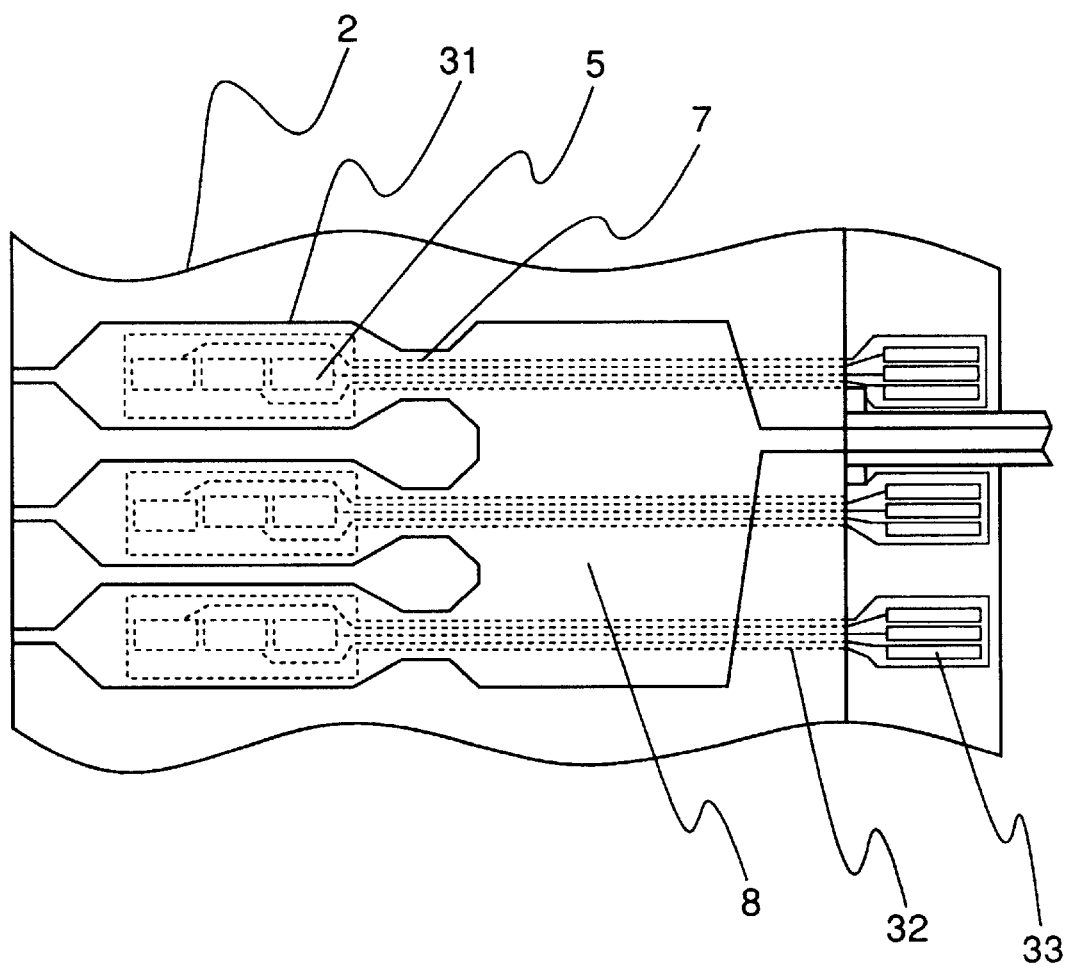
FIG. 3 is a plan view of FIG. 2 at line A—A.
Figure 4:
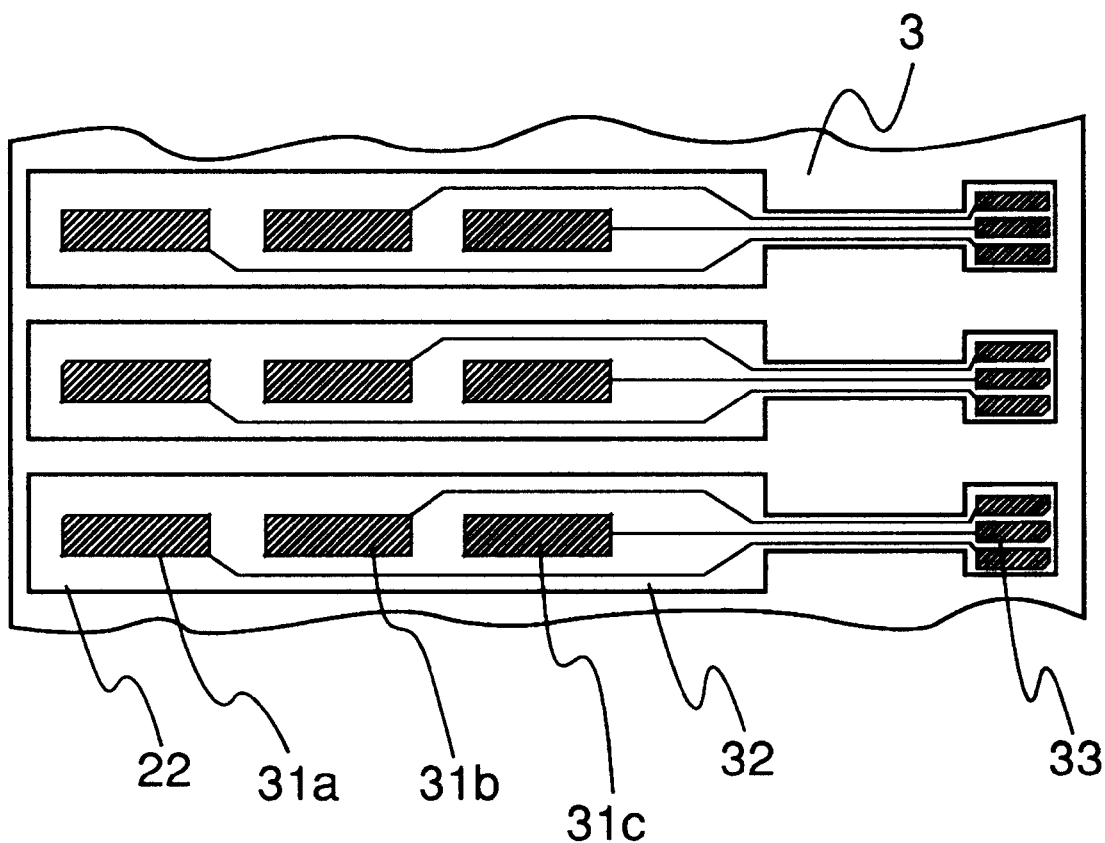
FIG. 4 is a plan view of the electrode portion of the ink jet recording apparatus according to the first embodiment of the present invention.

As shown in FIG. 1, this first embodiment is an edge ejection type ink jet recording apparatus whereby the ink droplets are ejected from nozzles 4 on the edge of substrate 2. FIG. 2 is a side cross section of the assembled ink jet head; FIG. 3 is a plan view through line A—A in FIG. 2; and FIG. 4 is a plan view of the electrode part of the ink jet recording apparatus according to the first embodiment of the invention.

As is evidenced from these figures, ink jet head 12 is the major component of this ink jet recording apparatus, and has a laminated structure achieved by stacking and bonding three substrates 1, 2, and 3 together.

The middle substrate 2 is a silicon substrate comprising: plural parallel nozzle channels 21 formed in the surface of and at equal intervals from one edge of middle substrate 2 to form plural nozzles 4; recesses 22 continuous to the corresponding nozzle channels 21 to form ejection chambers 6, the bottom wall of which comprises a diaphragm 5. Narrow channels 23 functioning as the ink inlets and forming orifices 7 are disposed at the backs of recesses 22. Recess 24 forms a common ink cavity 8 for supplying ink to each ejection chamber 6 through orifices 7. Recesses 25 form vibration chambers 9 for placement of the electrodes below diaphragm 5 as described in more detail hereinbelow. Recesses 25 are preferably etched to a depth of 0.275 microns. Nozzle channels 21 are preferably separated at a 0.508 mm pitch distance and are 60 microns wide.

Borosilicate glass is used for the upper substrate 1 bonded to the top surface of middle substrate 2. Bonding upper substrate 1 to middle substrate 2 completes formation of nozzles 4, ejection chambers 6, orifices 7 and ink cavity 8. Ink supply port 14 opening into ink cavity 8 is also formed in upper substrate 1, and is connected to an ink tank (not shown in the figure) through connector pipe 16 and tube 17.

Borosilicate glass is also used for bottom substrate 3 and is bonded to the bottom surface of middle substrate 2. Before bonding substrate 3 to substrate 2, ITO (Indium-tin oxide) is sputtered to a 0.1 micron thickness on the surface of bottom substrate 3 to form the electrodes at the positions of the diaphragms 5 in middle substrate 2. Three electrodes 31, each of approximately the same area, are formed as shown in FIG. 4. Each electrode 31 independently connects to a drive circuit 26 via a dedicated lead 32 and terminal members 33. An insulation layer 34 used to prevent dielectric breakdown and shorting is then formed by sputtering a 0.1 micron thick borosilicate glass film over the entire surface of bottom substrate 3 except directly over the electrode terminal members 33. Bottom substrate 3 is then attached to middle substrate 2 in a manner described herein below to complete vibration chambers 9.

Upper substrate 1 and middle substrate 2 are anodically bonded at 340° C. by applying an 800-V charge, and middle substrate 2 and bottom substrate 3 are bonded under the same conditions to assemble the ink jet head as shown in FIG. 2. Drive circuit 26 is then connected between middle substrate 2 and terminal members 33 of electrodes 31 to complete ink jet recording apparatus 10. Ink 11 is supplied from the ink tank (not shown in the figures) through ink supply port 14 into middle substrate 2 to fill the ink path, including ink cavity 8 and ejection chambers 6. Ink droplets 13 are ejected from nozzles 4 toward recording medium 15.

Figure 5:
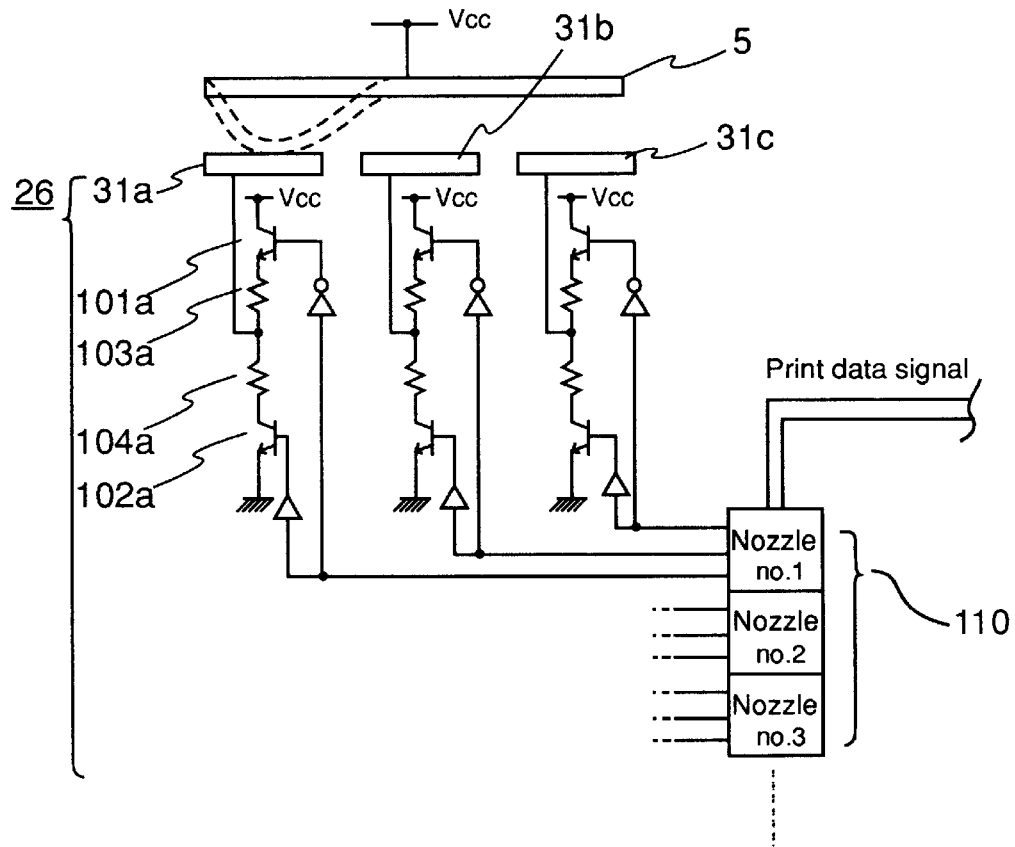
FIG. 5 is a circuit diagram of the drive circuit in the ink jet recording apparatus according to the first embodiment of the present invention.

FIG. 5 is a detailed circuit diagram of drive circuit 26. The print data signal containing gradient information is sent from the host apparatus (not shown in the figures) in a known manner and received by the controller 110. The controller in this embodiment is configured to decode three bits per nozzle based on the print data signal because three electrodes 31a, 31b, and 31c are provided opposite each diaphragm as shown in FIG. 4. For example, only that part of diaphragm 5 (indicated by the dotted line in FIG. 5) corresponding to electrode 31a is deflected by means of the Coulomb's force acting between diaphragm 5 and electrode 31a, when only transistor 101a is driven. The charge stored between diaphragm 5 and electrode 31a is then discharged by turning transistor 101a off and transistor 102a on. As a result, the restoring force created by the elasticity of diaphragm 5 instantaneously increases the pressure in ejection chamber 6, thereby ejecting an ink droplet corresponding to the volume indicated by the dotted line in FIG. 5 from the nozzle. The charge/discharge speed of the electrostatic actuators is set to predetermined values by means of resistors 103a and 104a.

The ink jet volume can therefore be selected from any of four levels by applying the pulse voltage to all, two, one, or none of the electrodes, and a four gradient image can be recorded by thus controlling the diameter of the dot forming each pixel. In tests using ink jet head 12 and drive circuit 26 described above incorporated into a printer driven with a 38-V drive voltage and 3.3 kHz drive frequency, an ink ejection volume of approximately 0.04 μcc was obtained when the pulse voltage was applied to only electrode 31a, approximately 0.08 cc when applied to electrodes 31a and 31b, and approximately 0.12 μcc when applied to electrodes 31a, 31b, and 31c.

Figure 6:
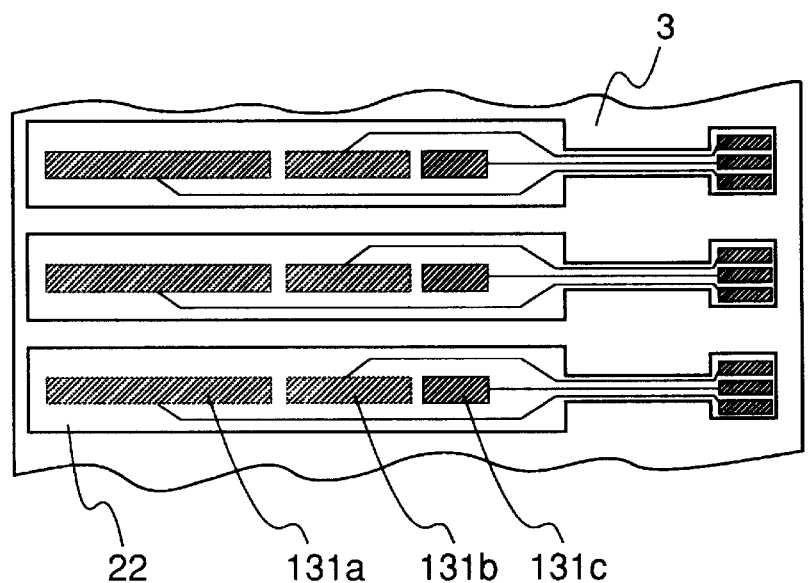
FIG. 6 is a plan view of the electrode part of the ink jet recording apparatus according to the second embodiment of the present invention.

A plan view of a second embodiment of the present invention is shown in FIG. 6. As in the first embodiment described above and shown in FIG. 4, three electrodes are formed for each diaphragm. In this embodiment, however, the electrodes are formed with the area of electrodes 131a: 131b: 131c conforming to the ratio 2.5 : 5 : 10. By thus providing electrodes of different areas, the ink ejection volume can be selected from a larger number of driven electrode area combinations, and a gradient image having six levels can be achieved by similarly varying the pixel dot diameter. In tests using ink jet head 12 and drive circuit 26 described above in reference to FIG. 6, which was incorporated into a printer driven with a 40-V drive voltage and 3.3 kHz drive frequency, an ink ejection volume of approximately 0.015 μcc was obtained when the pulse voltage was applied to only electrode 131a. Approximately 0.03 μcc was obtained when a pulse signal was applied to only electrode 131b, and approximately 0.06 μcc was obtained when applied solely to electrode 131c. Approximately 0.05 μcc was obtained when a pulse was applied to both electrodes 131a and 131b, and approximately 0.12 μcc was expelled when applied to all three electrodes 131a, 131b, and 131c.

Figure 7:
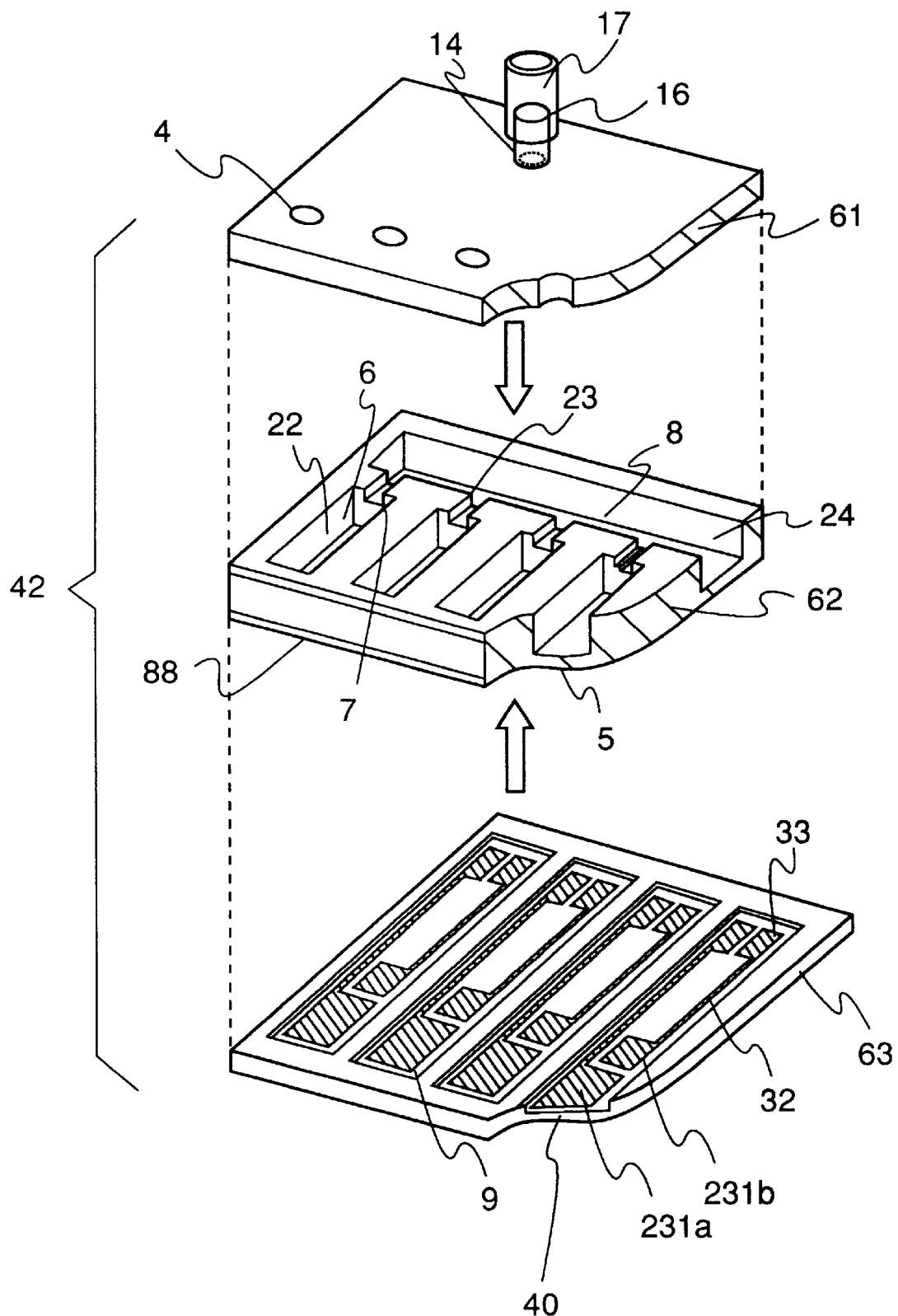
FIG. 7 is a partially exploded view and cross section of an ink jet recording apparatus according to the third embodiment of the present invention.

FIG. 7 is a partially exploded view and cross section of the major components of an ink jet recording apparatus according to a third embodiment of the present invention. As shown in FIG. 7, this is a face ejection type ink jet recording apparatus which ejects the ink droplets from nozzle holes 4 formed in the face of the substrate.

Also, as shown in FIG. 7, ink jet head 42 is the major component of this ink jet recording apparatus, and has a laminated structure achieved by stacking and bonding three substrates 61, 62, and 63 together.

The middle substrate 2 is a 400 micron thick, (110) surface orientation silicon substrate. Ejection chambers 6 are formed from recesses 22, at the backs of which are formed narrow channels 23 functioning as the ink inlets and forming orifices 7. Preferably, these ejection chambers 6 are formed at a pitch of 0.14 mm, and are each 100 microns wide. Bottom walls etched to a 3 micron thickness form the diaphragm 5 for each ejection chamber 6. Recess 24 forms a common ink cavity 8 for supplying ink to each respective ejection chamber 6. A thermal oxidation film 88 is formed to a 0.15 micron thickness on the bottom surface of middle substrate 62 to prevent shorting.

Borosilicate glass is used for the bottom substrate 63 which will eventually be bonded to the bottom surface of middle substrate 62. Recesses 40 forming vibration chambers 9 when bottom substrate 63 is bonded to middle substrate 62 are etched to a depth of 0.3 μm. ITO is then sputtered to a 0.1 μm thickness inside recesses 40 to form two electrodes 231a and 231b and their corresponding lead 32 and terminal 33 members. The surface area ratio of electrodes 231a and 231b is approximately 1:2.

In this embodiment, upper substrate 61 bonded to the top surface of middle substrate 62 is a stainless steel (SUS), 70 micron thick plate comprising nozzles 4 for ejecting the ink. Ink supply port 14 opening into ink cavity 8 is also formed in upper substrate 61, and is connected to an ink tank (not shown in the figure) through connector pipe 16 and tube 17.

Drive circuit 26, as shown in FIG. 5, is then connected between middle substrate 62 and terminal members 33 to complete the ink jet recording apparatus.

In similar tests driving this ink jet recording apparatus by applying a 40-V drive voltage from drive circuit 26 to electrodes 231a and 231b as described above in the first embodiment, an ink jet volume of approximately 0.04 gcc was obtained when the pulse voltage was applied to only electrode 231a, and was approximately 0.08 μcc when applied to both electrodes 231a and 231b.

Figure 8:
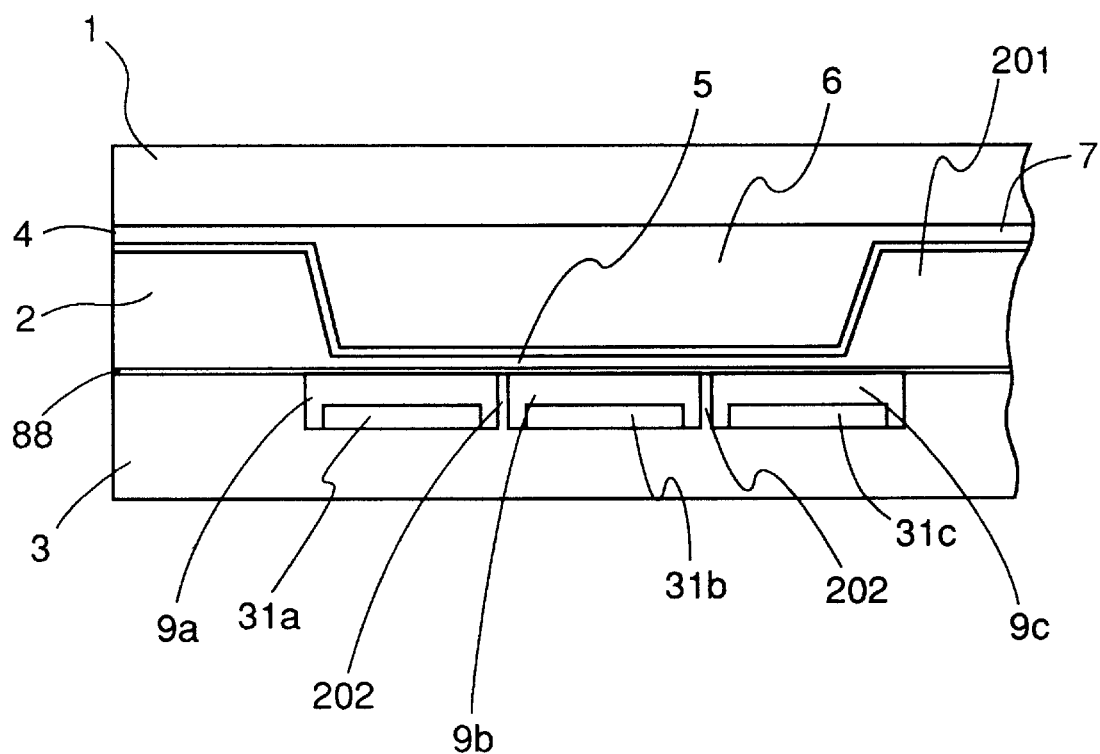
FIG. 8 is a cross section of the electrode part of an ink jet recording apparatus according to the fourth embodiment of the present invention.

FIG. 8 is a cross section diagram of the electrode member according to the fourth embodiment of the present invention.

Figure 9:
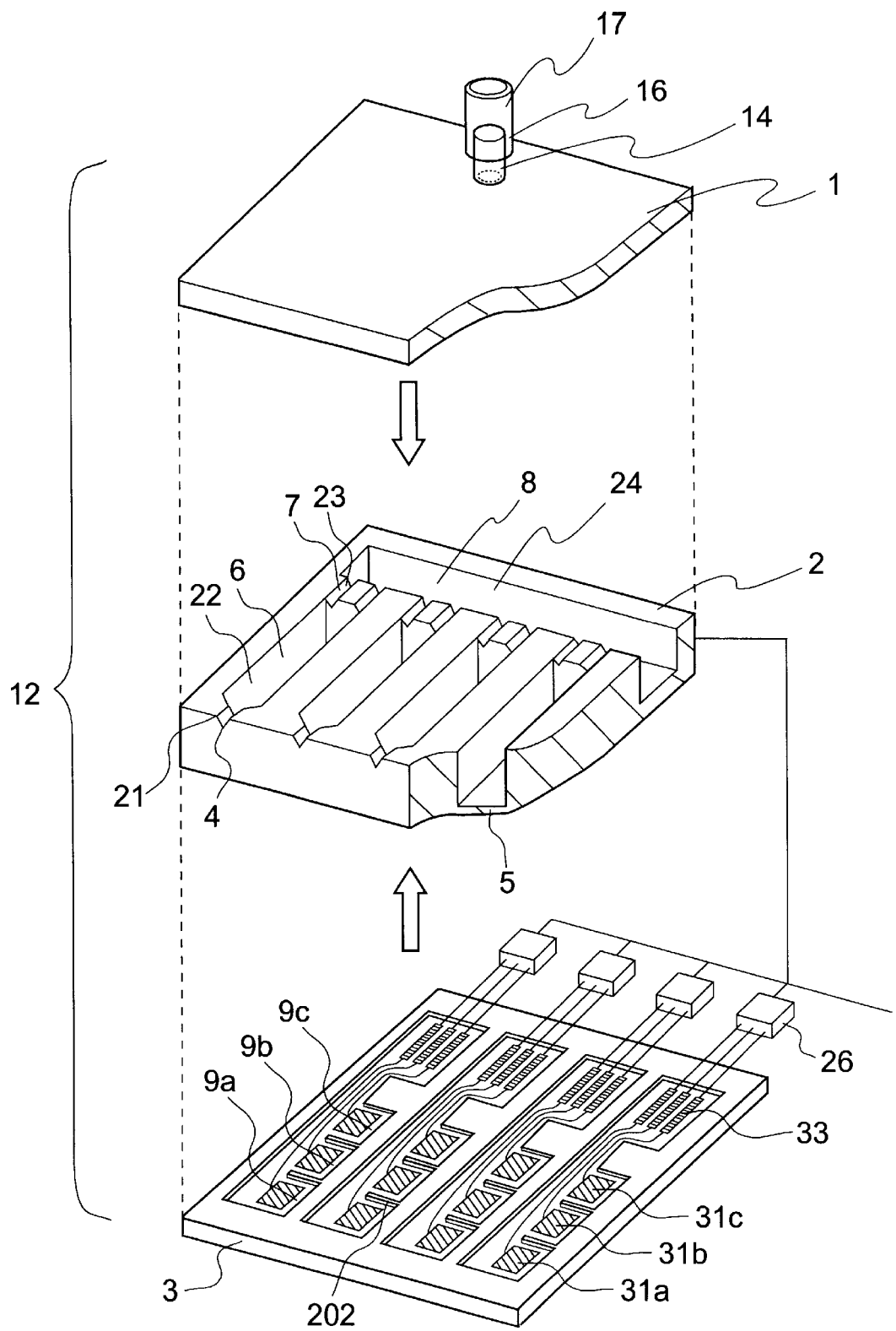
FIG. 9 is a partially exploded perspective view of the ink jet head shown in FIG. 8.

FIG. 9 is a partial exploded perspective view of the ink jet head according to this embodiment.

Bottom substrate 3 is a borosilicate glass substrate comprising plural channels separated by stay walls (support member) 202. These channels form vibration chambers 9a, 9b, and 9c when bottom substrate 3 is bonded to silicon middle substrate 2. Electrodes 31a, 31b, and 31c are provided in the bottom of the corresponding vibration chambers 9a, 9b, and 9c separated by gap G. Each of the vibration chambers is formed to the same 0.3 μm depth, and the electrodes are formed by sputtering a 0.1 micron thick ITO film in a desired electrode pattern with each electrode encompassing approximately the same area.

Diaphragms 5 of middle substrate 2 are formed simultaneously with formation of ejection chambers 6 by doping boron to the bottom side of the substrate at a concentration of $1 \times 10^{20}/cm^3$ to a depth of 1 micron by ion injection, patterning a thermal oxidation film on the surface of middle substrate 2 using a photolithography technique after heat diffusion, and then etching the exposed silicon with a KOH solution (potassium hydroxide). This is possible because the high concentration boron region is resistant to etching when utilizing a KOH solution, and 3 μM thick diaphragms 5 can thus be obtained using these areas (the etch stopping layer). After etching is completed, a thermal oxidation film 88 is formed to a 0.15 micron thickness on the bottom surface of middle substrate 2 to prevent shorting between the diaphragm and electrodes. The ink jet head is then assembled by bonding the three substrates using the same process described above in reference to the first embodiment.

By separating and supporting the vibration chambers below the diaphragms as described in this embodiment, the elasticity of the thin diaphragms can be strengthened to achieve sufficient ink ejection-performance. This technique also makes it possible to manufacture high precision diaphragms because it is possible to use silicon "etch stop" techniques.

It is difficult, for example, to set the deflection of the diaphragms (ink ejection volume) when a voltage is applied to both of two same-area electrodes to precisely twice the deflection when the voltage is applied to only one electrode because the diaphragms deflect irregularly. However, by providing stay walls supporting the diaphragms between adjacent electrodes as in the present embodiment, deformation of the diaphragm is suppressed when a voltage is applied to only one of the adjacent electrodes. The diaphragm will therefore not deflect excessively, diaphragm deflection can be uniformly determined according to the predetermined area of the electrode, and ink ejection volume can therefore be easily controlled.

As described hereinabove, an ink jet recording apparatus according to the present invention can eject ink droplets with the ink ejection volume precisely controlled by means of a simple control technique according to a specific pixel gradient based on a digital gradient signal, and can print high resolution gradient images using a low drive voltage.

The foregoing disclosure and description of the invention are illustrative and explanatory thereof, and various changes in the size, shape, materials, components, circuit elements, wiring connections and contacts, as well as in the details of the illustrated circuitry, construction and method of operation may be made without departing from the spirit of the invention.

What is claimed is:

1. An ink jet recording apparatus for recording in accordance with a received signal, comprising:
   an ink jet head, comprising:
   a first substrate comprising a channel having at least one wall, an electrostatically deformable diaphragm arranged at said one wall of said channel, and an ejection nozzle in communication with said channel; and
   a second substrate arranged on said first substrate, said second substrate comprising a plurality of electrodes, each of said electrodes arranged opposing a corresponding portion of said electrostatically deformable diaphragm and separated by a first gap distance therefrom; and
   a drive circuit for applying a voltage signal selectively between said electrostatically deformable diaphragm and at least a selected one of said plurality of electrodes according to the received signal to electrostatically deform at least a portion of said electrostatically deformable diaphragm corresponding to the at least a selected one of said plurality of electrodes and eject ink from said ejection nozzle.

2. The ink jet recording apparatus of claim 1, wherein said plurality of electrodes includes a first electrode having a first surface area and a second electrode having a second surface area different from the first surface area.

3. The ink jet recording apparatus of claim 1, further comprising a support member positioned beneath said diaphragm for partially restricting deformation of said electrostatically deformable diaphragm.

4. The ink jet recording apparatus of claim 3, wherein said support member extends from said second substrate between adjacent ones of said plurality of electrodes.

5. The ink jet recording apparatus of claim 3, wherein said support member substantially spans the first gap distance.

6. The ink jet recording apparatus of claim 1, further comprising a plurality of spaced-apart support members positioned beneath said electrostatically deformable diaphragm for partially restricting deformation of said electrostatically deformable diaphragm.

7. The ink jet recording apparatus of claim 6, wherein each said support member extends from said second substrate between adjacent ones of said plurality of electrodes.

8. The ink jet recording apparatus of claim 6, wherein each said support member substantially spans the first gap distance.

9. An ink jet recording apparatus for recording in accordance with first and second received signals, comprising:
   an ink jet head, comprising:
   a first substrate comprising a channel having at least one wall, an electrostatically deformable diaphragm arranged at said one wall of said channel, and an ejection nozzle in communication with said channel; and
   a second substrate arranged on said first substrate, said second substrate comprising a plurality of electrodes, each of said electrodes arranged opposing a corresponding portion of said electrostatically deformable diaphragm and separated by a first gap distance therefrom; and
   a drive circuit to selectively apply one of:
   a first voltage signal between said electrostatically deformable diaphragm and a first predetermined number of said plurality of electrodes according to the first received signal to electrostatically deform said electrostatically deformable diaphragm and eject a first quantity of ink from said ejection nozzle; and
   a second voltage signal between said electrostatically deformable diaphragm and a second predetermined number of said plurality of electrodes according to the second received signal to electrostatically deform said electrostatically deformable diaphragm and eject a second quantity of ink from said ejection nozzle.

10. The ink jet recording apparatus of claim 9, wherein said plurality of electrodes includes a first electrode having a first surface area and a second electrode having a second surface area different from the first surface area.

11. The ink jet recording apparatus of claim 9, further comprising a support member positioned beneath said diaphragm for partially restricting deformation of said electrostatically deformable diaphragm.

12. The ink jet recording apparatus of claim 11, wherein said support member extends from said second substrate between adjacent ones of said plurality of electrodes.

13. The ink jet recording apparatus of claim 11, wherein said support member substantially spans the first gap distance.

14. The ink jet recording apparatus of claim 9, further comprising a plurality of spaced-apart support members positioned beneath said electrostatically deformable diaphragm for partially restricting deformation of said diaphragm.

15. An ink jet recording apparatus for recording in accordance with a received signal, comprising:
   an ink jet head, comprising:
   a first substrate comprising a first major surface, a second major surface, a channel having at least one wall, an electrostatically deformable diaphragm arranged at said one wall of said channel, and an ejection nozzle in communication with said channel;
   a second substrate arranged on the first major surface of said first substrate, said second substrate comprising a plurality of electrodes, each of said electrodes arranged opposing a corresponding portion of said electrostatically deformable diaphragm and separated by a first gap distance therefrom;
   a third substrate arranged on the second major surface of said first substrate; and
   a drive circuit for applying a voltage signal selectively between said electrostatically deformable diaphragm and at least a selected one of said plurality of electrodes according to the received signal to electrostatically deform at least a portion of said electrostatically deformable diaphragm corresponding to the at least a selected one of said plurality of electrodes and eject ink from said ejection nozzle.

16. The ink jet recording apparatus of claim 15, wherein said plurality of electrodes includes a first electrode having a first surface area and a second electrode having a second surface area different from the first surface area.

17. The ink jet recording apparatus of claim 15, further comprising a support member positioned beneath said diaphragm for partially restricting deformation of said electrostatically deformable diaphragm.

18. The ink jet recording apparatus of claim 17, wherein said support member extends from said second substrate between adjacent ones of said plurality of electrodes.

19. The ink jet recording apparatus of claim 17, wherein said support member substantially spans the first gap distance.

20. The ink jet recording apparatus of claim 15, further comprising a plurality of spaced-apart support members positioned beneath said diaphragm for partially restricting deformation of said electrostatically deformable diaphragm.

21. The ink jet recording apparatus of claim 20, wherein each said support member extends from said third substrate between adjacent ones of said plurality electrodes.

22. An ink jet recording apparatus for recording in accordance with a received signal, comprising:
an ink jet head, comprising:
a first substrate having a first side and a second side and comprising a channel having at least one wall, and an electrostatically deformable diaphragm arranged at said one wall of said channel;
a second substrate arranged on the first side of said first substrate, said second substrate comprising a plurality of electrodes, each of said electrodes arranged opposing a corresponding portion of said electrostatically deformable diaphragm and separated by a first gap distance therefrom; and
a third substrate arranged on the second side of said first substrate, said third substrate comprising an ejection nozzle in communication with said channel; and
a drive circuit for applying a voltage signal selectively between said electrostatically deformable diaphragm and at least a selected one of said plurality of electrodes according to the received signal to electrostatically deform at least a portion of said electrostatically deformable diaphragm corresponding to the at least a selected one of said plurality of electrodes and eject ink from said ejection nozzle.

23. An ink jet recording apparatus for recording in accordance with first and second received signals, comprising:
an ink jet head, comprising:
a first substrate having a first side and a second side and comprising a channel having at least one wall and an electrostatically deformable diaphragm arranged at said one wall of said channel;
a second substrate arranged on the first side of said first substrate, said second substrate comprising a plurality of electrodes, each of said electrodes arranged opposing a corresponding portion of said electrostatically deformable diaphragm and separated by a first gap distance therefrom; and
a third substrate arranged on the second side of said first substrate, said third substrate comprising an ejection nozzle in communication with said channel; and
a drive circuit to selectively apply one of:
a first voltage signal between said electrostatically deformable diaphragm and a first predetermined number of said plurality of electrodes according to the first received signal to electrostatically deform said electrostatically deformable diaphragm and eject a first quantity of ink from said ejection nozzle; and
a second voltage signal between said electrostatically deformable diaphragm and a second predetermined number of said plurality of electrodes according to the second received signal to electrostatically deform said electrostatically deformable diaphragm and eject a second quantity of ink from said ejection nozzle.

24. An ink jet recording apparatus for recording in accordance with a received signal, comprising:
an ink jet head, comprising:
a first substrate comprising a first major surface, a second major surface, a channel having at least one wall, and an electrostatically deformable diaphragm arranged at said one wall of said channel;
a second substrate arranged on the first major surface of said first substrate, said second substrate comprising a plurality of electrodes, each of said electrodes arranged opposing a corresponding portion of said electrostatically deformable diaphragm and separated by a first gap distance;
a third substrate arranged on the second major surface of said first substrate and comprising an ejection nozzle in communication with said channel; and
a drive circuit for applying a voltage signal selectively between said electrostatically deformable diaphragm and at least a selected one of said plurality of electrodes according to the received signal to electrostatically deform at least a portion of said electrostatically deformable diaphragm corresponding to the at least a selected one of said plurality of electrodes and eject ink from said ejection nozzle.

25. An ink jet recording apparatus for recording in accordance with a received signal, comprising:
an ink jet head, comprising:
a first substrate comprising a channel having at least one wall, an electrostatically deformable diaphragm arranged at said one wall of said channel, and an ejection nozzle in communication with said channel; and
a second substrate arranged on said first substrate, said second substrate comprising a plurality of electrodes, each of said electrodes arranged opposing a corresponding portion of said electrostatically deformable diaphragm and separated by a first gap distance therefrom; and
drive means for applying a voltage signal selectively between said electrostatically deformable diaphragm and at least a selected one of said plurality of electrodes according to the received signal to electrostatically deform at least a portion of said electrostatically deformable diaphragm corresponding to the at least a selected one of said plurality of electrodes and eject ink from said ejection nozzle.

26. An ink jet recording apparatus for recording in accordance with a received signal, comprising:
an ink jet head, comprising:
a first substrate comprising a channel having at least one wall, an electrostatically deformable diaphragm arranged at said one wall of said channel, and an ejection nozzle in communication with said channel; and a second substrate arranged on said first substrate, said second substrate comprising a plurality of electrodes, each of said electrodes arranged opposing a corresponding portion of said electrostatically deformable diaphragm and separated by a first gap distance therefrom; and a drive circuit selectively coupled between said electrostatically deformable diaphragm and at least a selected one of said plurality of electrodes to apply a signal thereto according to the received signal to electrostatically deform at least a portion of said electrostatically deformable diaphragm corresponding to the at least a selected one of said plurality of electrodes and eject ink from said ejection nozzle.

27. An ink jet recording apparatus for recording in accordance with first and second received signals, comprising:

an ink jet head, comprising:
a first substrate comprising a channel having at least one wall, an electrostatically deformable diaphragm arranged at said one wall of said channel, and an ejection nozzle in communication with said channel; and a second substrate arranged on said first substrate, said second substrate comprising a plurality of electrodes, each of said electrodes arranged opposing a corresponding portion of said electrostatically deformable diaphragm and separated by a first gap distance therefrom; and a drive circuit
selectively coupled between said electrostatically deformable diaphragm and a first predetermined number of said plurality of electrodes to apply a first voltage signal according to the first received signal to electrostatically deform said electrostatically deformable diaphragm and eject a first quantity of ink from said ejection nozzle; and selectively coupled between said electrostatically deformable diaphragm and a second predetermined number of said plurality of electrodes to apply a second voltage signal according to the second received signal to electrostatically deform said electrostatically deformable diaphragm and eject a second quantity of ink from said ejection nozzle.

28. An ink jet recording apparatus for recording in accordance with first and second received signals, comprising:

an ink jet head, comprising:
a first substrate comprising a channel having at least one wall, an electrostatically deformable diaphragm arranged at said one wall of said channel, and an ejection nozzle in communication with said channel; and a second substrate arranged on said first substrate, said second substrate comprising a plurality of electrodes, each of said electrodes arranged opposing a corresponding portion of said electrostatically deformable diaphragm and separated by a first gap distance therefrom; and drive means to selectively apply one of:
a first voltage signal between said electrostatically deformable diaphragm and a first predetermined number of said plurality of electrodes according to the first received signal to electrostatically deform said electrostatically deformable diaphragm and eject a first quantity of ink from said ejection nozzle; and a second voltage signal between said electrostatically deformable diaphragm and a second predetermined number of said plurality of electrodes according to the second received signal to electrostatically deform said electrostatically deformable diaphragm and eject a second quantity of ink from said ejection nozzle.

\* \* \* \* \*

UNITED STATES PATENT AND TRADEMARK OFFICE
CERTIFICATE OF CORRECTION

PATENT NO.     : 6,120,124
DATED          : September 19, 2000
INVENTOR(S)    : Mitsuro Atobe, et al.

It is certified that an error appears in the above identified patent and that said Letters Patent is hereby corrected as shown below:

Title page, item 63, Related U.S. Application Data, please add --Continuation of application No. 08/483,666, June 7, 1995, abandoned, which is a -- before "Continuation-in-part of application No. 07/757,691".

Signed and Sealed this

Twenty-ninth Day of May, 2001

*Attest:*

NICHOLAS P. GODICI

*Attesting Officer*  *Acting Director of the United States Patent and Trademark Office*